Figure 1:
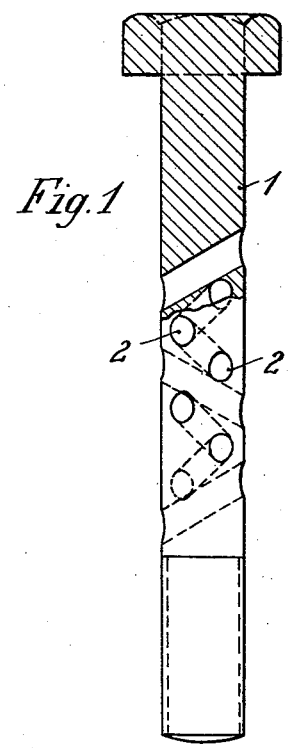

Aug. 1, 1939.  P. SCHAURTE  2,168,000

SCREW OR SCREW BOLT

Filed Oct. 23, 1936

Inventor:
Paul Schaurte
By Williams, Bradbury, McCaleb & Hicks,
Attys.

Patented Aug. 1, 1939

2,168,000

UNITED STATES PATENT OFFICE 2,168,000

SCREW OR SCREW BOLT

Paul Schaurte, Munich, Germany, assignor to the firm: Bauer & Schaurte, Rheinische Schrauben- und Mutternfabrik A.-G., Neuss-on-the-Rhine, Germany Application October 23, 1936, Serial No. 107,113
In Germany October 29, 1935

4 Claims. (Cl. 85—1)

It is well known to provide the bolt of screws with one or more tapered or reduced portions the advantageous action of which in relieving permanent stresses or strains is also well known. A great disadvantage of screws or screw bolts with tapered or reduced outer diameter consists in this, that on screwing together a plurality of relatively thin parts no means are present to guide these parts, so that the position of the parts to be connected together cannot be determined. With screws having a tapered or reduced bolt the use of a special fitting pin is required for determining the position of the parts to be connected together and the necessity of this pin, of course, raises the costs of the elements of construction.

Now, the object of the present invention is to provide a screw or screw bolt eliminating the disadvantages mentioned above, but maintaining the advantages of a screw having a tapered or reduced bolt. The screw bolt according to the invention is a bolt which is provided with a plurality of bores arranged transversely to its axis. Setting aside the practically unimportant entrance-and-exit portions of the bores, this screw has, over the length of the portion reduced in cross sectional area, a uniform outer diameter which is as great as the portion of the bolt not reduced in cross section. The static and dynamic characteristics of strength of a screw according to the invention are as good as those of the well known screws of the prior art having a reduced or tapered outer diameter. Moreover, the screw or bolt according to the invention still has the further effect, that, besides the elasticity due to the material, additional elastic deformations, due to the particular form of the remaining bolt cross sections, are possible if longitudinally directed forces, for instance during erection, come into action. This property is particularly enhanced if in accordance with a special modification of the invention the projections of the longitudinal axes of the successive bores upon a plane vertically to the axis of the bolt form angles between each other.

Another object of the invention is the provision of an improved screw or bolt, the shank of which is adapted to resist tensile stress in a resilient manner, and the external size and shape of which is substantially uniform so that the bolt may be made to fit its aperture as closely as any conventional bolt.

In the accompanying drawing one construction according to the invention is shown by way of example.

Figure 2:
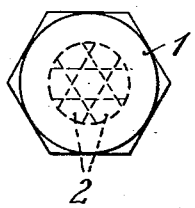

In this drawing:

Fig. 1 is an elevation and partial longitudinal section of a screw according to the invention having a hexagon head and Fig. 2 shows a plan view of this screw.

As shown in the drawing, the shank 1 of the screw is provided with bores 2 extending transversely to the axis of the screw bolt. The bores 2 in this construction are, as may be seen from Fig. 2, so arranged that the longitudinal axes of the successive bores form an angle of 120° with each other. The bores in the construction shown are, moreover, so provided, that the longitudinal axes of the bores form an acute angle, i. e. an angle of about 60°, with the longitudinal axis of the screw. The arrangement of the bores, the number, dimensions and position of same may, however, be varied considerably without affecting the properties of the bolt. The longitudinal axes of the bores may be arranged in parallel to each other, they may, however, also extend vertically to the longitudinal axis of the screw or else be directed at a greater angle than in the construction shown. The bores are so arranged, that with regard to the elasticity the most favorable conditions and the most favorable other properties of the screw are obtained for the purpose in question. The arrangement of the bores may eventually be directed by observing that the remaining cross section of the reduced portion of the bolt is equal all over the length and equal or smaller than the cross section of the diameter at the bottom of the corresponding thread.

What I claim is:

1. A screw bolt having a head and a substantially cylindrical shank, said head being located at one end and said cylindrical shank having at its opposite end a threaded portion, said bolt being provided intermediate the head and threaded portion with a plurality of separate non-intersecting transverse bores extending from one side of the bolt to an opposite side, said bores being located at different angles with respect to each other to provide the shank of said bolt with a resilient strain-resisting portion of substantially the same diameter, but of reduced effective cross sectional area, whereby the elastic characteristics of the bolt are improved.

2. A screw bolt having a head and a substantially cylindrical shank, said head being located at one end and said cylindrical shank having at its opposite end a threaded portion, said bolt being provided intermediate the head and threaded portion with a plurality of separate transverse bores extending from one side of the bolt to an opposite side, said bores being located at different angles with respect to each other to provide the shank of said bolt with a resilient strain-resisting portion of substantially the same diameter, but of reduced effective cross-sectional area, whereby the elastic characteristics of the bolt are improved, the said bores extending diagonally of the axis of said bolt.

3. A screw bolt having a head and a substantially cylindrical shank, said head being located at one end and said cylindrical shank having at its opposite end a threaded portion, said bolt being provided intermediate the head and threaded portion with a plurality of separate transverse bores extending from one side of the bolt to an opposite side, said bores being located at different angles with respect to each other to provide the shank of said bolt with a resilient strain-resisting portion of substantially the same diameter, but of reduced effective cross-sectional area, whereby the elastic characteristics of the bolt are improved, the said bores extending diagonally of the axis of said bolt, the diameters and bore of the transverse bores being such that the effective cross-sectional area of the bolt at said bores is less than the cross section of the bolt at the base of the screw thread.

4. A bolt having flexibility in tension, comprising a metallic member having a head and a shank of continuous external shape, said shank being provided with a plurality of transverse apertures extending through said shank diagonally, and said apertures being spaced from each other longitudinally of said shank and extending transversely to each other whereby the effective cross sectional area in the region of said apertures is reduced and the flexibility of the bolt in tension is increased without diminishing the external size of the bolt.

PAUL SCHAURTE.